US010273024B1

(12) United States Patent
Youngquist et al.

(10) Patent No.: US 10,273,024 B1
(45) Date of Patent: Apr. 30, 2019

(54) RADIATION REFLECTOR AND EMITTER

(71) Applicant: The United States of America as represented by the Adminstrator of the National Aeronautics and Space Administration, Washington, DC (US)

(72) Inventors: Robert C. Youngquist, Cocoa, FL (US); Mark A. Nurge, Oviedo, FL (US)

(73) Assignee: United States of America as Represented by the Adminstrator of NASA, Washington, DC (US)

( * ) Notice: Subject to any disclaimer, the term of this patent is extended or adjusted under 35 U.S.C. 154(b) by 63 days.

(21) Appl. No.: 15/277,446

(22) Filed: Sep. 27, 2016

Related U.S. Application Data

(60) Provisional application No. 62/239,735, filed on Oct. 9, 2015.

(51) Int. Cl.
  *G02B 5/08* (2006.01)
  *B64G 1/58* (2006.01)

(52) U.S. Cl.
  CPC .................. *B64G 1/58* (2013.01)

(58) Field of Classification Search
  CPC ...... G02B 5/0833; G02B 5/26; G02B 5/0816; G02B 5/085; G02B 5/0858; C03C 17/36
  USPC ........ 428/328, 334, 338, 364, 372; 359/359, 359/360
  See application file for complete search history.

(56) References Cited

U.S. PATENT DOCUMENTS

| 4,828,354 | A * | 5/1989 | Yoshida | G02B 6/102 |
| | | | | 385/128 |
| 5,658,504 | A | 8/1997 | Shibata et al. | |
| 8,749,881 | B2 * | 6/2014 | Banerjee | G02B 5/0825 |
| | | | | 359/359 |
| 9,254,089 | B2 * | 2/2016 | Tearney | A61B 5/0062 |
| 9,715,047 | B2 * | 7/2017 | Banerjee | G02B 5/0825 |
| 2008/0204861 | A1 * | 8/2008 | Shiraishi | G02B 5/0891 |
| | | | | 359/359 |
| 2009/0153953 | A1 * | 6/2009 | Banerjee | G02B 5/0833 |
| | | | | 359/359 |
| 2011/0091658 | A1 * | 4/2011 | Banerjee | G02B 5/0825 |
| | | | | 427/427.4 |
| 2011/0128616 | A1 * | 6/2011 | Banerjee | G02B 5/085 |
| | | | | 359/359 |
| 2011/0134515 | A1 * | 6/2011 | Banerjee | G02B 5/281 |
| | | | | 359/359 |
| 2013/0026371 | A1 * | 1/2013 | Holloway | G01T 1/16 |
| | | | | 250/362 |
| 2013/0320220 | A1 * | 12/2013 | Donowsky | G01T 7/00 |
| | | | | 250/366 |
| 2014/0060643 | A1 * | 3/2014 | Martin | B01J 37/349 |
| | | | | 136/256 |
| 2014/0226197 | A1 * | 8/2014 | Natsumeda | G03B 21/204 |
| | | | | 359/241 |
| 2015/0033988 | A1 * | 2/2015 | Wu | G02B 5/26 |
| | | | | 106/417 |
| 2015/0103398 | A1 * | 4/2015 | Banerjee | G02B 5/281 |
| | | | | 359/360 |
| 2015/0369928 | A1 * | 12/2015 | Reese | G01T 1/2018 |
| | | | | 250/362 |
| 2016/0176223 | A1 * | 6/2016 | Degott | C09D 5/36 |
| | | | | 283/85 |
| 2017/0248746 | A1 * | 8/2017 | Banerjee | G02B 5/22 |
| 2017/0253070 | A1 * | 9/2017 | Loginov | B05D 3/207 |
| 2018/0045865 | A1 * | 2/2018 | Banerjee | G02B 5/26 |
| 2018/0111406 | A1 * | 4/2018 | Loginov | B42D 25/369 |

OTHER PUBLICATIONS

Youngquist et al., "Achieving cryogenic temperatures in deep space using a novel coating," Optics Letters 41, No. 6 (2016): 1086-1089.
Youngquist et al., "Cryogenic Selective Surfaces," Final Report on a Phase I NIAC Study, (2016) 1-63.

\* cited by examiner

*Primary Examiner* — Douglas J McGinty
(74) *Attorney, Agent, or Firm* — Jonathan J. Leahy; Mark P. Dvorscak

(57) ABSTRACT

A multi-layer radiation reflector/emitter includes first and second materials. The first material is transparent to radiation in a wavelength spectrum ranging from approximately 0.2 microns to at last 6 microns. The first material is a self-supporting arrangement of randomized particles having an average dimension in a range of approximately 0.2 microns to approximately 0.4 microns and defining a fill factor of approximately 0.1 to approximately 0.5. The second material reflects radiation having a wavelength greater than approximately 2 microns.

16 Claims, 4 Drawing Sheets

US 10,273,024 B1

RADIATION REFLECTOR AND EMITTER

CROSS-REFERENCE TO RELATED PATENT APPLICATION(S)

This patent application claims the benefit of and priority to U.S. Provisional Patent Application Ser. No. 62/239,735, filed Oct. 9, 2015, the contents of which are hereby incorporated by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND OF THE INVENTION

1. Field of the Invention

This invention relates to the protection of structures from radiation heating. More specifically, the invention is a covering or coating that reflects and emits radiation over a broad wavelength spectrum.

2. Description of the Related Art

There are many challenges involved in deep space exploration. A number of these challenges can be advanced or even solved by the development of structure coatings that reject most of the sun's energy while still providing for far-infrared radiative emission. For example, current structure-coating technology used on space-based storage tanks, tank support struts, etc., limits the storage of liquid oxygen in deep space to days or weeks, i.e., not long enough to support a trip to Mars or operate a deep-space liquid oxygen storage depot. Further, the operation of superconductors in space is limited as it is difficult to maintain superconductors at optimal low temperatures. Accordingly, a critical aspect of spacecraft and spacecraft system design is the maintenance of stable and low operating temperatures by accounting for internal heat generation, irradiance from the sun and planetary bodies, and radiative emission.

SUMMARY OF THE INVENTION

Accordingly, it is an object of the present invention to provide an outer covering for temperature control of spacecraft structures and systems.

Another object of the present invention is to provide a structure coating/covering system that reflects incoming solar/planetary radiation and emits radiation generated within and absorbed by the structure.

Other objects and advantages of the present invention will become more obvious hereinafter in the specification and drawings.

In accordance with the present invention, a multi-layer radiation reflector/emitter includes a layer of a first material and a layer of a second material. The first material is transparent to radiation in a wavelength spectrum ranging from approximately 0.2 microns to at least 6 microns. The first material consists of a self-supporting arrangement of randomized particles having an average dimension in a range of approximately 0.2 microns to approximately 0.4 microns and defining a fill factor of approximately 0.1 to approximately 0.5. The second material reflects radiation having a wavelength greater than approximately 2 microns.

BRIEF DESCRIPTION OF THE DRAWING(S)

Other objects, features, and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
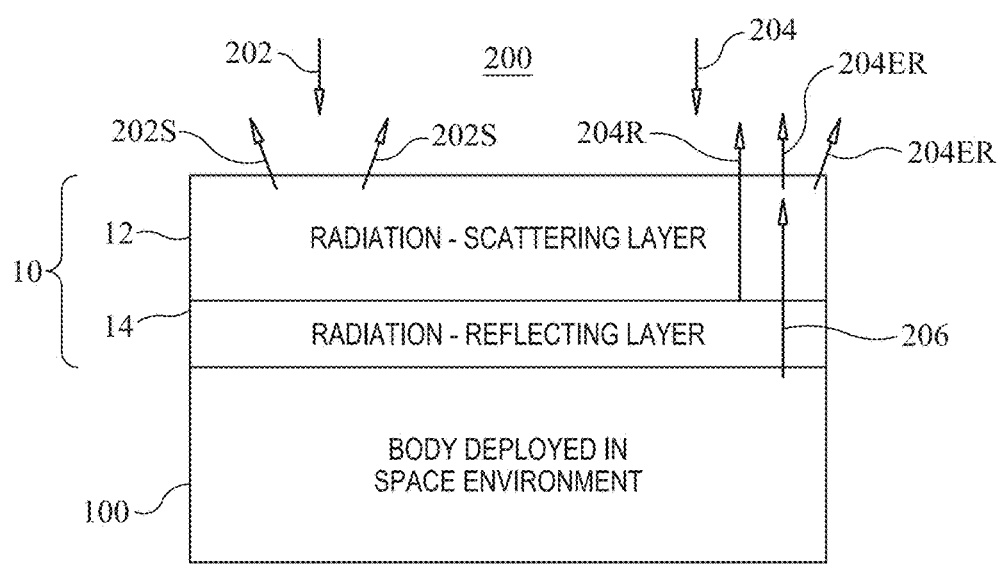
FIG. 1 is a schematic view of a multi-layer radiation reflector/emitter in accordance with the present invention.

Referring now to the drawings and more particularly to FIG. 1, a multi-layer radiation reflector/emitter in accordance with an embodiment of the present invention is shown schematically and is referenced generally by numeral 10. As will be explained further herein, reflector/emitter 10 defines the framework for a novel composite structure that aids in controlling temperature of bodies that it covers or coats. In general, reflector/emitter 10 defines a novel composite structure for covering/coating spacecraft and spacecraft systems whose effective operation requires maintenance at very low temperatures, i.e., on the order of 75 K or less. Reflector/emitter 10 can be realized in a variety of ways depending on the type of "body" that is to be covered or coated. Accordingly, it is to be understood that the fabrication methods used to construct reflector/emitter 10 and/or apply/affix reflector/emitter 10 to a body are not limitations of the present invention.

In general, reflector/emitter 10 is coupled to an outer surface of a body 100 that is to be deployed in a space environment and whose operation is reliant on being maintained at low temperatures. For example, body 100 could be a cryogenic fuel storage tank, supports for such a storage tank, a superconductor(s), or any other structure or system that will be exposed to the space environment. As a general proposition, reflector/emitter 10 operates to reflect substantially all incoming solar radiation (i.e., approximately 99.9% or more), while also providing for radiation emission from body 100 due to internally-generated heat and any absorbed radiation. In the illustrated embodiment, reflector/emitter 10 is a two-layer structure to include a radiation-scattering layer 12 and a radiation-reflecting layer 14 with layer 12 being exposed to a space environment 200. Layers 12 and 14 can be bonded to one another for mutual structural support. Additional layers could be used to provide other functionality (e.g., bonding, mechanical strength, etc.) without departing from the scope of the present invention.

Optically, radiation-scattering layer 12 is made from a material that is transparent to incoming radiation 202 in a wavelength spectrum that ranges from approximately 0.2 microns to at least 6 microns. Incoming radiation 202 includes all visible, ultraviolet, and near- to mid-infrared radiation originating from the sun and planetary bodies. Layer 12 is constructed to scatter substantially all of the energy associated with incoming radiation 202 thereby expelling same from layer 12 as scattered radiation 202S. To achieve these results, layer 12 is a self-supporting arrangement of randomized particles whose average dimension ranges from approximately 0.2 microns to approximately 0.4 microns. The self-supporting arrangement of particles should define a volumetric fill factor ranging from approximately 0.1 to approximately 0.5, with the remaining volume of layer 12 being defined by spacing or voids filled by space environment 200, i.e., typically a vacuum.

Figure 2A:
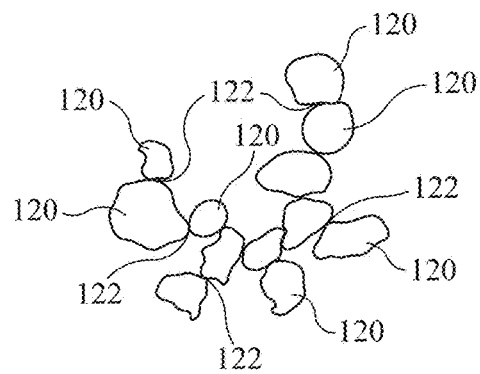
FIG. 2A is a microscopic schematic view of a powder-particle-based radiation-scattering material in accordance with an embodiment of the present invention.
Figure 2B:
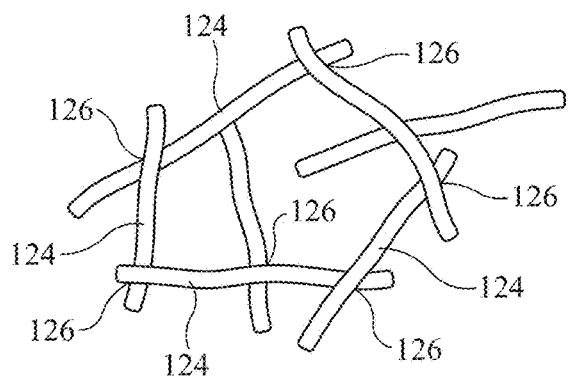
FIG. 2B is a microscopic view of a fibrous-particle-based radiation-scattering material in accordance with another embodiment of the present invention.
Figure 2C:
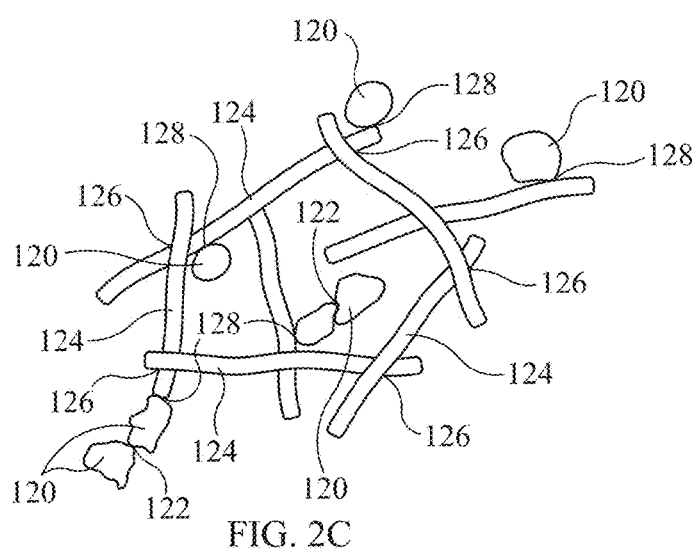
FIG. 2C is a microscopic schematic view of a powder-particle- and fibrous-particle-based radiation-scattering material in accordance with another embodiment of the present invention.

The self-supporting arrangement of particles comprising layer 12 can be realized in a variety of ways without departing from the scope of the present invention. Several examples are illustrated in FIGS. 2A-2C. Referring first to FIG. 2A, a microscopic schematic view of a portion of layer 12 made from powder-like particles 120 is shown. Powder-like particles 120 can be regular or irregularly shaped, can be the same or similarly sized, or can be a mixture of sizes/shapes without departing from the scope of the present invention. For powder-like particles 120, the average dimension referred to above is defined by the particle's average diameter. Particles 120 are joined, fused, or bonded at adjoining surfaces as indicated by numeral 122.

Referring to FIG. 2B, a microscopic schematic view of a portion of layer 12 is made from fibrous-like particles 124 that can be regularly/irregularly shaped, the same or similarly-sized, or a mixture of sizes and shapes. For fibrous-like particles 124, the average dimension referred to above is the fiber's average diameter. Particles 124 are joined, fused, or bonded at adjoining surfaces as indicated by numeral 126. FIG. 2C illustrates another embodiment where a microscopic schematic view of a portion of layer 12 is comprised of a mixture of powder-like particles 120 and fibrous-like particles 124 where the joined, fused, or bonded adjoining surfaces between particles 120 and 124 is indicated by numeral 128.

Radiation-reflecting layer 14 is made from a material that efficiently reflects radiation having a wavelength that is greater than approximately 2 microns. It is well known in the art that particle scattering becomes less efficient as the wavelength of the radiation increases relative to the particle size. So, for sufficiently long wavelength radiation, reflection is provided by radiation-reflecting layer 14. Since many metals become nearly ideal reflectors at long wavelengths, a metallic layer or film is a good choice for layer 14 thereby extending the performance of reflector/emitter 10 to longer wavelengths. Beyond the cutoff wavelength (i.e., the wavelength where the material making up radiation-scattering layer 12 transitions from being transparent to absorbing), incoming radiation is absorbed. In most deep space locations, the amount of long-wave radiation is small so that very little energy is absorbed. However, since a good absorber is also a good emitter beyond the cutoff wavelength, reflector/emitter 10 becomes an efficient emitter of radiation beyond the cutoff wavelength thereby allowing reflector/emitter 10 to chill to very low temperatures.

Incoming far-infrared and long-wave radiation 204 (whose wavelength generally exceeds approximately 6 microns) that is not scattered by layer 12 will be reflected back by layer 14 as reflected radiation 204R. Longer wavelength portions of radiation 204 absorbed by scattering layer 12 as well as heat 206 generated by body 100 are emitted as emitted radiation 204ER. To achieve these results, layer 14 can be a metal (e.g., silver, aluminum, tungsten, etc.) having suitable radiation reflecting properties. Since even very thin metallic films are good reflectors, layer 14 adds minimal weight to reflector/emitter 10 while also providing for efficient heat flow between the object being cooled and layer 12.

A variety of materials can be used to construct radiation-scattering layer 12. By way of example, several readily available materials were tested via a modeling procedure based on well-known equations for the scattering of light by thin layers composed of particles. The same models are used in describing the performance of white paint. These models were then extended to a much broader wavelength range using an approximate Mie scattering formula to account for the variations in particle sizes. The reflectance of the metallic layer and the optical properties of the scattering material were obtained from optical database handbooks. The complete model has been peer reviewed and published. See Youngquist et al., "Achieving cryogenic temperatures in deep space using a coating," *Optics letters* 41, no. 6 (2016): 1086-1089, the contents of which are hereby incorporated by reference.

The modeled materials were cesium bromide (CsBr), potassium bromide (KBr), potassium chloride (KCl), sodium chloride (NaCl), barium fluoride ($BaF_2$), calcium fluoride ($CaF_2$), and magnesium fluoride ($MgF_2$). Modeling results associated with some or all of these materials are presented in the table below and in FIGS. 3-5.

| Material | Absorbed Power (W) Plate | Temp (K) | Absorbed Power (W) Cylinder | Temp (K) | Absorbed Power (W) Sphere | Temp (K) |
| --- | --- | --- | --- | --- | --- | --- |
| $BaF_2$ | 1.04 | 61.5 | 2.12 | 56.0 | 3.35 | 53.3 |
| $CaF_2$ | 2.15 | 71.9 | 4.29 | 64.9 | 6.72 | 61.5 |
| $MgF_2$ | 2.61 | 74.9 | 5.32 | 68.0 | 8.43 | 64.6 |
| NaCl | 0.73 | 56.9 | 1.47 | 51.9 | 2.32 | 49.5 |
| KCl | 0.73 | 56.7 | 1.46 | 51.7 | 2.31 | 49.3 |
| KBr | 0.66 | 55.7 | 1.32 | 50.7 | 2.07 | 48.3 |
| CsBr | 0.59 | 56.8 | 1.19 | 51.0 | 1.87 | 48.6 |

The table above shows the absorbed power in watts (W) and the equilibrium temperatures in degrees kelvin (K) reached for seven different materials coating the following three objects:
- a two-sided 1 meter square plate with one side directly facing the sun,
- a 1 meter long and 1 meter radius cylinder whose axis is perpendicular to the direction to the sun, and
- a 1 meter radius sphere.

Radiation from the ends of the cylinder was ignored so that the results can be extrapolated to cylindrical wires and struts of arbitrary length. The thickness of the coatings was 5 millimeters (mm) and the scattering materials were modeled to have an average particle dimension of 0.25 microns and a fill factor of 0.3. The lowest temperatures were achieved for the sphere because the sphere has more radiative area to absorption area than the cylinder, which has more than the two-sided plate. The variation in temperature with material is primarily due to the material's infrared absorption of solar radiation and the material's far-infrared emissivity. For example, $MgF_2$ yields higher temperatures than $BaF_2$ because it absorbs more infrared radiation as indicated by the absorbed power result. However, CsBr absorbs less power than any material, but does not have the lowest temperature due to its limited far-infrared emissivity.

Figure 3:
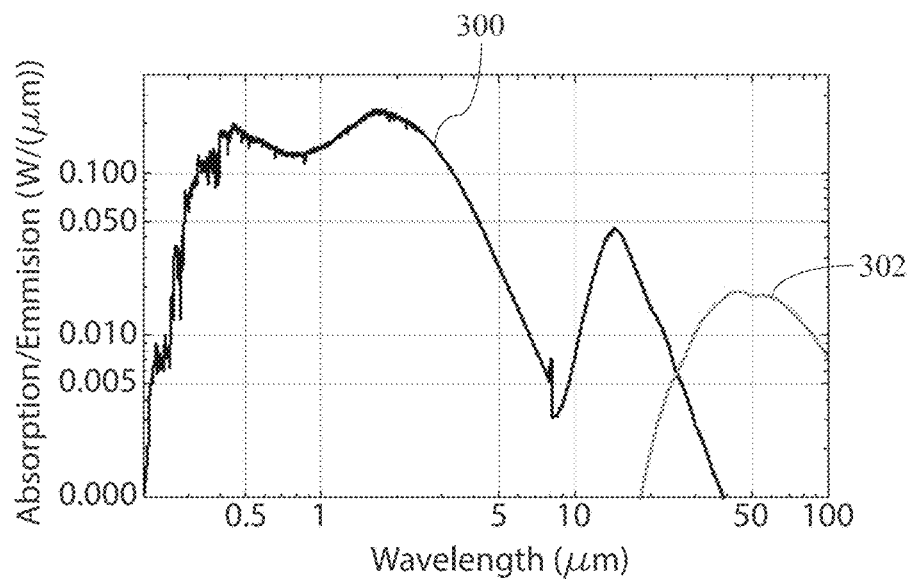
FIG. 3 is a plot of absorption/emission versus wavelength for a 1-meter square coated/covered plate facing the sun in accordance with an embodiment of the present invention.

FIG. 3 shows an absorbed solar spectral irradiance plot 300 for a 1 square meter plate facing the sun, with a 5 mm thick $BaF_2$ coating on silver placed on both sides of the plate. Note that the reflector/emitter of the present invention can be placed on both sides of a plate because a plate can emit radiation from both sides thereof even though it receives solar radiation on only one side. The broad peak in plot 300 is indicative of the small portion of the solar spectrum that makes it through the scattering layer and is absorbed by the silver. The visible portion of the solar spectrum has been reduced by a factor of about 10,000. The peak in the 10-20 micron regime of plot 300 corresponds to direct absorption of the solar irradiance by the $BaF_2$. A thermal spectral emission plot 302 has a peak in the 40-100 micron range. In this case, the plate absorbs about 1.04 watts of the 1366 watts of solar power and reaches thermal equilibrium at 61.5 K.

Figure 4:
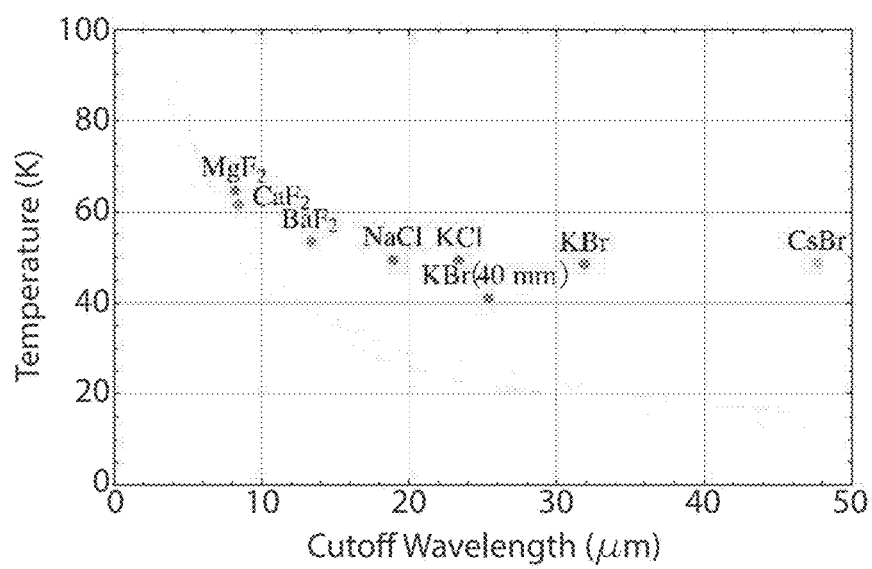
FIG. 4 is a plot of cutoff wavelength versus temperature for several exemplary materials for the radiation scattering layer of the reflector/emitter.

FIG. 4 plots predicted temperatures versus cutoff wavelength for 5 mm coatings of the above-noted seven materials on a sphere. An extra KBr data point is included for a 40 mm thick coating on a sphere. Note that all materials yield temperatures below 75 K.

Figure 5:
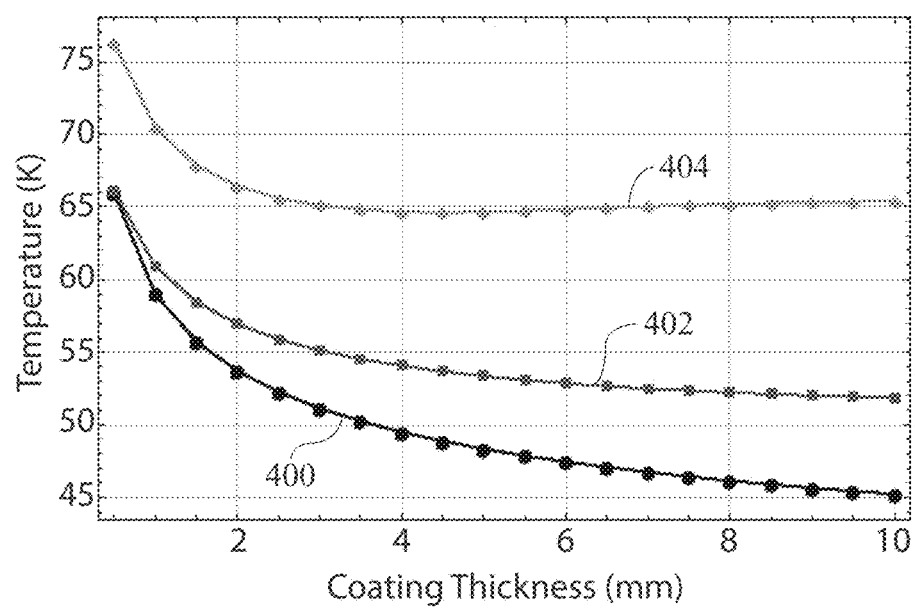
FIG. 5 is a plot of temperature versus coating thickness for several exemplary materials used for the radiation scattering of the reflector/emitter.

FIG. 5 shows equilibrium temperatures for coated spheres as the radiation-scattering material layer thickness is varied for KBr (curve 400), $BaF_2$ (curve 402), and $MgF_2$ (curve 404). Cryogenic temperatures are achieved even for very thin radiation-scattering material layers of 0.5 microns thick. As the coating thickness increases, more backscattering occurs lowering the temperature to as low as 45 K for KBr when the radiation-scattering material thickness is increased to 10 microns.

As mentioned above, fabrication of a reflector/emitter in accordance with the present invention can be achieved in a variety of ways without departing from the scope of the present invention. Such fabrication methods can include, but are not limited to, physical vapor deposition, pressing, sintering, foaming, and sol-gel fabrication. Each will be described briefly below.

Physical vapor deposition can be used to fabricate a thin coating (smooth or textured) without the use of a sacrificial substrate or mold, or can be used to fabricate a structured cellular or foam coating on a sacrificial polymeric material that is subsequently "burned off." Pressing can be used to fabricate a structured cellular coating where a powder of the radiation-scattering material is mixed with a sacrificial material with the mixture then being pressed under extreme pressure to produce a firm disc of material. The sacrificial material is then removed by either a burning process or a chemical washing process thereby leaving a disc of the above-described self-supporting radiation-scattering material. Sintering can be used to fabricate a structural cellular coating as a powdered form of the radiation-scattering material whereby it is heated adequately to bind the particles together without melting them. Foaming can be used to fabricate a porous film as gases are generated by the decomposition of organic components mixed with radiation-scattering particles. Sol-gel fabrication methods have the potential to produce highly-structured porous coatings. For example, the radiation-scattering material can be reacted with hydrofluoric acid to form the sol-gel.

The advantages of the present invention are numerous. The radiation reflector/emitter can be used to cover or coat a variety of spacecraft and/or spacecraft systems whose efficient operation requires being maintained at very low temperatures on the order of 75 K or less. The reflector/emitter can be fabricated with readily available and relatively low-cost materials. Excellent results can be achieved for radiation-scattering material thicknesses of as little as 5 mm. In applications where weight is not critical, the thickness of the radiation-scattering material can be increased to achieve even lower temperature maintenance.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

We claim:

1. A multi-layer radiation reflector/emitter, comprising:
    a layer of a first material transparent to radiation in a wavelength spectrum ranging from approximately 0.2 microns to at least 6 microns, said first material consisting of a self-supporting arrangement of randomized particles having an average dimension in a range of approximately 0.2 microns to approximately 0.4 microns and defining a fill factor of approximately 0.1 to approximately 0.5; and
    a layer of a second material for reflecting radiation having a wavelength greater than approximately 2 microns.

2. A multi-layer radiation reflector/emitter as in claim 1, wherein said second material comprises silver.

3. A multi-layer radiation reflector/emitter as in claim 1, wherein said particles include fibrous particles.

4. A multi-layer radiation reflector/emitter as in claim 1, wherein said particles include powder particles.

5. A multi-layer radiation reflector/emitter as in claim 1, wherein said first material is bonded to said second material.

6. A multi-layer radiation reflector/emitter as in claim 1, wherein said first material is selected from the group consisting of cesium bromide, potassium bromide, potassium chloride, sodium chloride, barium fluoride, calcium fluoride, and magnesium fluoride.

7. A multi-layer radiation reflector/emitter, comprising:
    a first layer of a radiation-scattering material consisting of a self-supporting arrangement of randomized particles having an average dimension in a range of approximately 0.2 microns to approximately 0.4 microns and defining a fill factor of approximately 0.1 to approximately 0.5, said radiation-scattering material selected from the group of cesium bromide, potassium bromide, potassium chloride, sodium chloride, barium fluoride, calcium fluoride, and magnesium fluoride; and
    a second layer of a material adjacent to said first layer for reflecting radiation having a wavelength greater than approximately 2 microns.

8. A multi-layer radiation reflector/emitter as in claim 7, wherein said second layer comprises silver.

9. A multi-layer radiation reflector/emitter as in claim 7, wherein said particles include fibrous particles.

10. A multi-layer radiation reflector/emitter as in claim 7, wherein said particles include powder particles.

11. A multi-layer radiation reflector/emitter as in claim 7, wherein said first layer is bonded to said second layer.

12. A multi-layer radiation reflector/emitter, comprising:
a metallic film; and
a layer of a radiation-scattering material on said film, said layer consisting of a self-supporting arrangement of randomized particles having an average dimension in a range of approximately 0.2 microns to approximately 0.4 microns and defining a fill factor of approximately 0.1 to approximately 0.5, said radiation-scattering material selected from the group of cesium bromide, potassium bromide, potassium chloride, sodium chloride, barium fluoride, calcium fluoride, and magnesium fluoride.

13. A multi-layer radiation reflector/emitter as in claim 12, wherein said metallic film comprises a film of silver.

14. A multi-layer radiation reflector/emitter as in claim 12, wherein said particles include fibrous particles.

15. A multi-layer radiation reflector/emitter as in claim 12, wherein said particles include powder particles.

16. A multi-layer radiation reflector/emitter as in claim 12, wherein said layer of said radiation-scattering material is bonded to said metallic film.

\* \* \* \* \*